UNITED STATES PATENT OFFICE.

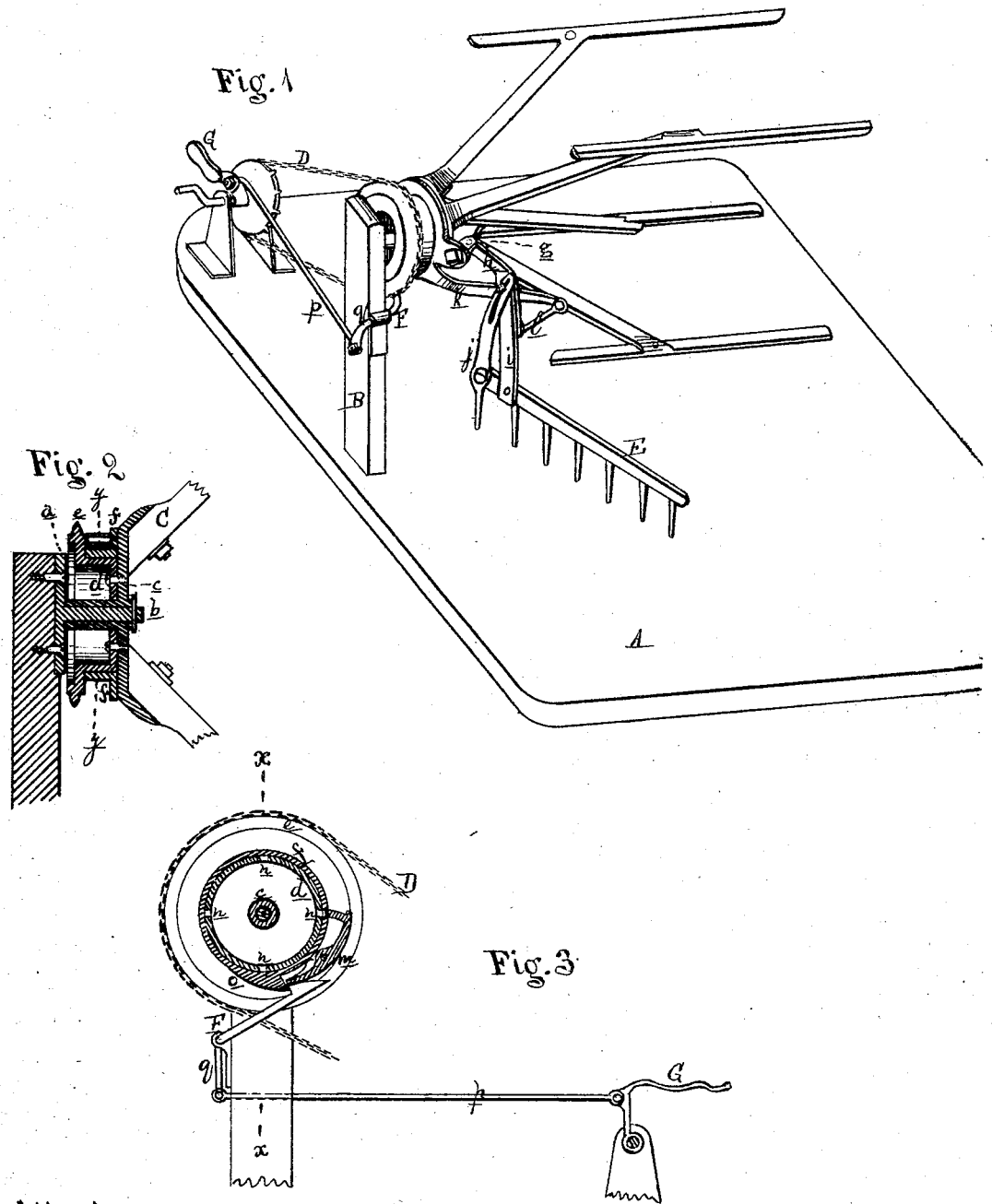

OLE O. STORLE, OF MILWAUKEE, WISCONSIN.

IMPROVEMENT IN HARVESTER-RAKES.

Specification forming part of Letters Patent No. 147,194, dated February 3, 1874; application filed November 24, 1873.

*To all whom it may concern:*

Be it known that I, OLE O. STORLE, of Milwaukee, in the county of Milwaukee and State of Wisconsin, have invented an Improvement in Reel-Rakes for Harvesters, of which the following is a specification:

The nature of this invention relates to an improvement in that class of harvester-rakes which revolve with the reel and describe a segment of a circle on the platform to sweep off the grain. The object of the invention is to so construct and arrange the mechanism which actuates the rake as that the driver may, by pressing a treadle, throw the rake out of gear and keep it motionless at will, and without interfering with the operation of the reel.

Figure 1 is a perspective view of the rake and reel mounted on the platform. Fig. 2 is a longitudinal vertical section through the reel-hub, rake-collar, and chain-wheel at $xx$ in Fig. 3, which is a cross-section at $yy$ in Fig. 2.

In the drawing, A represents the platform of a harvester, on which is erected a reel-standard, B, having secured to one side, near the top, a plate, $a$, from which projects a stud, $b$, to receive the hub $c$ of the reel C, which rotates on said stud. The hub has bolted to its face a drum, $d$, the inner end of which is outwardly flanged and provided with studs to form a chain-wheel, $e$, around which passes an endless chain, D, continuously driven from any convenient shaft in the harvester to give the reel its rotation. $f$ is a rake-collar, sleeved on the drum $d$, with a projecting lug between two of the reel-arms, to which lug is hinged, at $g$, a bent hanger, $h$, to whose end is secured the shank $i$ of the rake E, pivoted thereto at the heel, and adjustable, as to its inclination, by means of the slotted heel-brace $j$. Just behind the lug a bent arm, $k$, projects outwardly from the rake-collar, and to its outer end is pivoted a radius-rod, $l$, whose other end is secured to the shank $i$ of the rake. To cause the rake-collar to engage with the drum and be revolved with it, a pawl, $m$, thrown out by a spring at one end, has its other end bent to pass through an opening in the collar, to enter and engage with any one of four openings, $n$, in the periphery of said drum. At the base of the pawl a cam-like projection, $o$, is formed on the periphery of the collar. F is a harpoon-headed lever, actuated by a treadle, G, placed in convenient proximity to the driver's foot, through a rod, $p$, and crank $q$, journaled in bearings across the reel-standard. By depressing the treadle, the hooked head of the lever presses in the free end of the pawl, withdrawing its other end from the hole $n$ in the drum, and at the same time catches the cam-like projection $o$ of the collar, whose motion it arrests, while the reel is free to revolve. Releasing the treadle, the spring again causes the pawl to lock the collar and drum together, causing the rake to revolve with the reel.

In Fig. 1 the position of the parts are represented as thrown into gear. The rake maintains the angular position shown in this figure until it passes the center in descending, when it falls between the reel-bars and approaches the platform in a plane parallel therewith, describing, as it passes over it, by reason of the radius-rod, nearly a quarter circle before being lifted up, delivering the grain over the side. By this arrangement the driver can gather the grain in bundles of any size, regardless of the varying thickness of the grain as it stands in the field.

What I claim as my invention is—

1. The combination, with the drum $d$ and the reel C, of the collar $f$, carrying the rake E, the pawl $m$, projection $o$, lever F, treadle G, rod $p$, and crank $q$, substantially as and for the purpose set forth.

2. The combination, with the standard B and stud $b$, of the hub $c$, reel C, drum $d$, chain-wheel $e$, collar $f$, hanger $h$, hinged at $g$ to said collar, shank $i$, rake E, bent arm $k$, radius-rod $l$, pawl $m$, holes $n$, projection $o$, lever F, treadle G, rod $p$, and crank $q$, substantially as and for the purpose set forth.

OLE O. STORLE.

Witnesses:
 WM. H. LOTZ,
 ABRAHAM GOTTLIEB.